3,165,541
PROCESS FOR HYDROXYLATING STEROIDS
Allan Eugene Hydorn, Milltown, John Nicholas Korzun, North Brunswick, and James Riva Moetz, New Brunswick, N.J., assignors to Olin Mathieson Chemical Corporation, New York, N.Y., a corporation of Virginia
No Drawing. Filed May 20, 1963, Ser. No. 281,742
9 Claims. (Cl. 260—397.4)

This invention relates to a new chemical process and more particularly to an improved process for converting pregnenes (including pregnadienes, pregnatrienes, pregnatetraenes, etc.) to their cis-di- or polyhydroxy derivatives.

Prior to this invention, various laboratory methods were known for converting steroids of the pregnene series, containing a reactive olefinic bond, to their corresponding cis-dihydroxy or polyhydroxy derivatives. When attempts were made to duplicate these laboratory methods on a large scale, however, numerous difficulties were encountered. Thus, the use of osmium tetroxide is severely limited in its practical application because of the expense and toxicity of the reactant. Multiple step processes for preparing dihydroxy derivatives from the corresponding epoxy starting materials are sometimes used, but because of the numerous steps, the over all yields are comparatively low, and the products are contaminated with precursors and/or rearranged isomers not easily removed by normal purification processes. The relatively simple and preferred small scale laboratory procedure for preparing dihydroxy or polyhydroxy steroids by use of a permanganate, therefore, afforded the most promising method for the commercial production of such steroids. Unfortunately, however, when attempts were made to scale-up this laboratory procedure, even at a ten to twenty gram level, the desired product was obtained only in relatively low yield and low purity. This was due to the fact that with a strong oxidizing agent such as permangante there was extensive by-product formation because of the inherent inability to adequately control the extent of oxidation as a batch process.

It is an object of this invention, therefore, to provide a commercially feasible process for preparing dihydroxy or polyhydroxy steroids from their corresponding dehydro derivatives.

It is another object of this invention to provide a process for preparing dihydroxy or polyhydroxy steroids from their corresponding dehydro derivatives in high yield and purity in either gram or kilogram quantities. It is another object of this invention to provide a process for preparing dihydroxy or polyhydroxy steroids from their corresponding dehydro derivatives wherein only a small amount of valuable steroid is committed to reaction at any given time.

These objects are achieved by the process of this invention, which essentially comprises continuously intermixing solutions of a permanganate and a dehydro steroid capable of being di- or polyhydroxylated at such a rate that the mole ratio of permangante to reactive double bond of steroid is at all times at least 1:1 but preferably less than 2:1, followed after an optimum number of seconds by immediate reduction of excess permanganate by continuously intermixing the reaction mixture stream with a reducing solution stream and recovering the dihydroxy steroid formed.

Although any steroid may be used, provided that it contains one or more double-bonds capable of being converted to a cis-dihydroxy derivative, and hence suitable steroids include those containing double bonds in one of the positions: 14,15; 17,20; 20,21; 16,17; or a combination of such bonds, the preferred steroids are those containing a double-bond in the 16,17-position. Such steroids include those of the pregnene series of the general formula

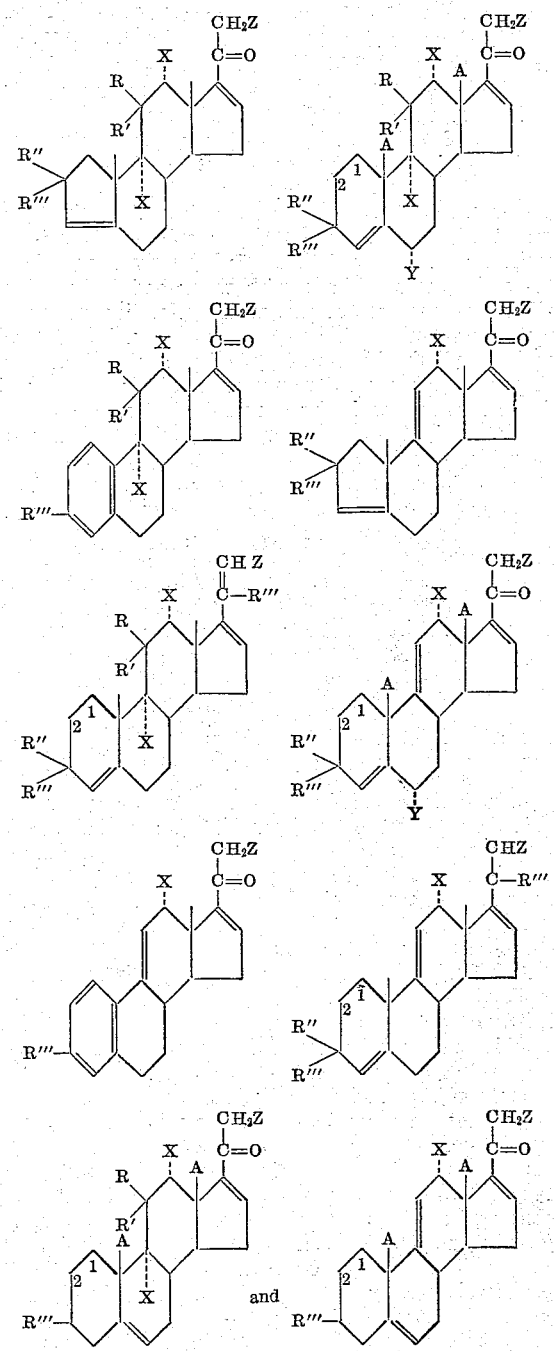

wherein the 1,2-position is saturated or double-bonded, R is hydrogen, R' is hydrogen or hydroxy (preferably β-hydroxy), or together R and R' is keto (oxo); R" is hydrogen, R''' is hydroxy or acyloxy, or together R" and R''' is keto; A is hydrogen or methyl; X is hydrogen, halo (preferably chloro or fluoro), or lower alkyl (e.g., methyl), at least one X being hydrogen; Y is hydrogen, halo (preferably fluoro), or lower alkyl (e.g., methyl), and Z is hydrogen, halo, hydroxy, or acyloxy. The preferred acyloxy radicals are those obtained from hydrocarbons carboxylic acids of less than twelve carbon atoms, as exemplified by the lower alkanoic acids (e.g., acetic, propionic and butyric acids), the lower alkenoic acids, the monocyclic aryl carboxylic acids (e.g., benzoic acid), the monocyclic aralkanoic acids (e.g., phenacetic acid), the cycloalkane carboxylic acids, and the cycloalkene carboxylic acids.

Examples of suitable steroid reactants include: 16-dehydroprogesterone, 16-dehydropregnenolone, 16-dehydro-A-norprogesterone, 16-dehydrocorticosterone, 9α-fluoro-16-dehydrocorticosterone, 6α,9α-difluoro-16-dehydrocorticosterone, $\Delta^{1,4,9(11),16}$-pregnatetraene-3,20-dione-21-ol, $\Delta^{4,9(11),16}$-pregnatriene-3,20-dione-21-ol, $\Delta^{1,5,9(11),16}$-pregnatetraene-20-one-3,21-diol, $\Delta^{1,5,9(11),16}$-pregnatriene-20-one-3,21-diol-21-acetate, 14-dehydroprogesterone, 14-dehydropregnenolone, and esters of those steriods which contain a 3 and/or 21-hydroxy group (preferably an ester with a hydrocarbon carboxylic acid of less than twelve carbon atoms and optimally an acetate).

For use in the process of this invention, the steroid reactant is dissolved in an organic solvent which is inert to permanganate oxidation. The preferred organic solvents are those miscible with water and include lower alkanones, such as acetone, acetonitrile, dioxane, and dimethylformamide. Although any concentration of steroid, within the limit of its solubility in the solvent selected, may be used, the preferred range of steroid is such that its final concentration in the steroid feed stream is about 5 to about 35 g./liter (and optimally about 15 to about 25 g./liter).

Although any permanganate may be used, the preferred permanganates are those soluble in water in a concentration of at least about 10 g./liter at room temperature. Such permanganates include the alkali metal permanganates (e.g., sodium permanganate and potassium permanganate), and other metal permanganates, e.g., zinc permanganate. The permanganate is dissolved in water, or an aqueous organic solvent, such as a mixture of water and one of the water-miscible organic solvents listed hereinbefore. Although any concentration of permanganate may be used, the permanganate is preferably added in a concentration such that the final concentration of the permanganate in the permanganate feed stream is about 2 to about 30 g./liter (and optimally about 10 to about 20 g./liter).

In the preferred embodiment of this invention, in particular with steroids which are susceptible to rearrangement in basic solution, an acid is also added to the reaction mixture to maintain the pH of the reaction mixture at a constant value. For this purpose, a solution of the acid in water, one of the water-miscible organic solvents listed hereinbefore, or an aqueous mixture thereof, is added to the reaction medium, either as a separate entity or by prior admixture with the steroid solution. Suitable acids are organic acids, such as formic acid, acetic acid or other lower carboxylic acids. The amount and rate of acid added is so adjusted to assure that the reaction medium is maintained at an acid pH, preferably one in the range of about 4 to about 7.

After the reaction has been completed, the excess permanganate, if any, is reduced by treatment with a reducing agent such as sulfur dioxide or a bisulfite, as exemplified by an alkali metal bisulfite (e.g., sodium bisulfite or potassium bisulfite). To accomplish this, the reducing agent is dissolved in water prior to introduction into the reaction medium.

In accordance with the process of this invention, the steroid solution and the permanganate solution are added continuously to a reaction vessel, such as a stirred tube reactor, in such proportion that there is present in the reaction at least one mole, but preferably less than 2 moles of permanganate per mole of reactive double bond in the steroid. Optimally, to assure complete conversion of the steroid reactant to its di- or polyhydroxy derivative, the permanganate is present in a ratio of about 1.0 to about 1.5 moles of permanganate per mole of reactive double bond of steroid reactant.

The reaction is allowed to proceed for a period of time of about 1 second to about 60 seconds (optimally about 2 seconds to about 7 seconds), after which the reaction is immediately quenched by introduction of the reducing agent stream to destroy any permanganate still present in the medium. Although any normal reaction temperature may be used, the preferred temperature range is about −40° C. to about +40° C. (optimally about −5° C. to about +5° C.). Since the reaction of permanganate with the steroid double bond(s) is exothermic, this temperature is maintained by precooling the reactants and/or externally cooling the reaction mixture.

By the practice of this invention, the di- or polyhydroxy steroid is obtained in high yields (greater than about 90% weight based on the steroid reactant) in a high degree of purity (greater than 95% purity). The steroid may be recovered from the reaction medium by usual techniques, as more fully detailed in the examples following.

The following examples illustrate the processes of this invention (all temperatures being in centigrade):

EXAMPLE 1

*16α,17α-Dihydroxyprogesterone*

(A) PREPARATION OF REACTANTS

A 10 kg. quantity of 16,17-dehydroprogesterone is dissolved in 350 liters of acetone. Additional acetone is then added to give a final solution volume of 428 liters (23.3 g. of steroid/liter of solution). A solution of 9.0 kg. of potassium permanganate in 150 liters of water is prepared. The solution is heated to boiling and boiled for one hour. The solution is then cooled to 25–30°, and 0.200 kg. of Hyflo is added, and the solution is filtered. The solution is then diluted with water to give a final concentration of 49 kg. of potassium permanganate per liter. Acetone is then added to give a final volume of solution of 448 liters.

A 6.9 kg. amount of sodium bisulfite is dissolved in sufficient water to give a final volume of 46.0 liters.

Also, 2.42 liters of 90% formic acid is dissolved in sufficient water to give 31.1 liters of solution. This formic acid solution is then added to the steroid solution prepared above.

(B) THE REACTION

The steroid solution and the permanganate solution prepared in (A) are each cooled to −10°. These solutions are then fed at equal rates into the reaction zone of a tube reactor equipped with an agitator. The rates are so adjusted that the two solutions are in contact at 0° for two to seven seconds before the reaction is quenched by the addition of the sodium bisulfite solution, at 25°, at the quenching zone of the tube reactor, added at a rate which is about 3% of the combined reactant rate.

(C) ISOLATION OF THE PRODUCT

The reaction mixture is collected, Hyflo is added in a ratio of 1 kg./200 liters of reaction mixture and filtered to remove the manganese dioxide formed. The filter cake is washed with 90% aqueous acetone and the wash is combined with the filtrate. The combined wash and filtrate is adjusted to pH 7.0–7.5 with 5% sodium bicarbonate solution and the filtrate is concentrated under vacuum until all the acetone is removed. The concentrate is then filtered to remove the precipitated 16α,17α-dihydroxyprogesterone. The precipitate is slurried in 20.0 liters of methanol and heated to 40–50° for five minutes. The slurry is cooled to 10°, held for 30 minutes, and filtered. The precipitate is washed with 5.0 liters of methanol, and dried to yield about 9.0 kg. of 16α,17α-dihydroxyprogesterone of better than 95% purity by paper chromatographic assay, M.P. 208–210°. The purity of the dihydroxyprogesterone received can approach 100%, depending on how well equal reactant flow rates are maintained. Contamination, if present, is usually a few percent of unreacted 16-dehydroprogesterone.

EXAMPLE 2

*16α,17α-Dihydroxypregnenolone Acetate*

A solution of 2.0 g. of 16-dehydropregnenolone acetate and 4.6 ml. of 10% formic acid in 40 ml. of acetone, and a solution of 1.2 g. potassium permanganate and 18 ml. of water in 86 ml. of acetone are run simultaneously into a small laboratory-scale continuous-flow reactor at −10° at such a rate that the total reaction time is about 10 seconds before quenching in 8.0 ml. of 10% sodium bisulfite solution. The reaction mixture is filtered to remove precipitated manganese dioxide and concentrated to remove acetone. The crude product is recrystallized from methanol to give 1.8 g. of 16α,17α-dihydroxypregnenolone acetate, M.P. 193–195°.

EXAMPLE 3

*A-Nor-3-Pregnene-2,20-Dione-16α,17α-Diol*

A solution of 100 g. of A-nor-3(5),16-pregnadiene-2,20-dione and 230 ml. of 10% formic acid in 3000 ml. of acetone, and a solution of 63 g. potassium permanganate and 900 ml. water in 2330 ml. of acetone are run simultaneously into the continuous-flow reactor at −20° at such a rate that the total reaction time is about 8 seconds before quenching in 400 ml. of 10% sodium bisulfite solution. After filtration and wash of the precipitated maganese dioxide, and concentration to 500 ml., the product solution is diluted with 6 liters of water. The solid which separates is filtered and dried to give 85 g. of A-nor-3-pregnene-2,20-dione - 16α,17α - diol, M.P. 187–190°. Recrystallization from acetone raises the melting point to 189–192°; $[\alpha]_D^{22}$ −44° (c. 1% in $CHCl_3$).

This invention may be variously otherwise embodied within the scope of the appended claims.

What is claimed is:

1. A process for converting a 16-dehydro steroid of the pregnene series into its 16α,17α-dihydroxy derivative, which comprises continuously feeding into a reaction medium a solution of said steroid and a solution of a water-soluble permanganate at such a rate that the ratio of permanganate to reactive double-bond per mole of steroid in the reaction medium is at least one mole to one and less than about two moles to one, permitting the reagents to interact for a period of time from about one second to about sixty seconds, and reducing any excess permanganate to manganese dioxide immediately after the desired reaction has been completed.

2. The process of claim 1 wherein the steroid is 16-dehydroprogesterone.

3. The process of claim 1 wherein the steroid is 16-dehydropregnenolone acetate.

4. The process of claim 1 wherein the steroid is 16-dehydro-A-norprogesterone.

5. A process for converting a 16-dehydro steroid of the pregnene series into the 16α,17α-dihydroxy derivative, which comprises continuously feeding into a reaction medium a solution of said steroid, a solution of an alkali metal permanganate, and an acid, at such rate that the ratio of permanganate to reactive double bond per mole of steroid in the reaction medium is at least one mole to one and less than about two moles to one, permitting the reagents to interact for a period of time from about one second to about sixty seconds at a temperature in the range of about −40° C. to about +40° C., and then reducing any excess permanganate to manganese dioxide.

6. The process of claim 5 wherein the steroid reactant is 16-dehydroprogesterone.

7. The process of claim 5 wherein the steroid reactant is 16-dehydropregnenolone acetate.

8. The process of claim 5 wherein the steroid reactant is 16-dehydro-A-norprogesterone.

9. A process for coverting 16-dehydroprogesterone into 16α,17α - dihydroxyprogesterone, which comprises continuously feeding into a reaction mixture a solution of 16-dehydroprogesterone in an acidic aqueous water-miscible organic solvent and an aqueous solution of potassium permanganate, at such rate that the ratio of permanganate to steroid is kept in the range of about 1.0 mole to about 1.5 moles of permanganate per mole of steroid, permitting the reagents to interact for a period of time from about two seconds to about seven seconds at a temperature in the range of about −5° C. to about +5° C., and then immediately treating the resulting mixture with an alkali bisulfite, whereby any excess potassium permanganate is destroyed.

References Cited by the Examiner

UNITED STATES PATENTS 3,060,175  10/62  Origoni et al. _____ 260—239.55

OTHER REFERENCES

Tull et al.: "Journal Amer. Chem. Soc. (1955), vol. 77, page 196 relied on.

LEWIS GOTTS, *Primary Examiner.*